US007559883B2

(12) United States Patent
Rata et al.

(10) Patent No.: US 7,559,883 B2
(45) Date of Patent: Jul. 14, 2009

(54) BEAM STRUCTURE FOR A PAPER, BOARD OR FINISHING MACHINE

(75) Inventors: Ilkka Rata, Jyväskylä (FI); Matti Pajala, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 735 days.

(21) Appl. No.: 11/257,771

(22) Filed: Oct. 25, 2005

(65) Prior Publication Data

US 2006/0085938 A1 Apr. 27, 2006

(30) Foreign Application Priority Data

Oct. 26, 2004 (FI) .................................. 20041379

(51) Int. Cl.
*F16C 13/00* (2006.01)

(52) U.S. Cl. ................. 492/47; 492/6; 492/7; 118/261; 162/281

(58) Field of Classification Search ..................... 492/6, 492/7, 17, 20, 47; 118/126, 261; 162/281; 101/216
See application file for complete search history.

(56) References Cited

U.S. PATENT DOCUMENTS 1,145,558 A * 7/1915 Coppage ........................ 492/6
2,261,740 A * 11/1941 Makarius ........................ 492/7
2,949,852 A * 8/1960 Schaefer ...................... 101/375
3,055,083 A * 9/1962 Stobi ............................. 492/7
3,094,771 A * 6/1963 Robertson ....................... 492/7
4,158,128 A * 6/1979 Evdokimov et al. .......... 219/469
4,299,162 A * 11/1981 Hartmann et al. ............. 100/43
4,487,122 A * 12/1984 George et al. ................ 101/153
4,558,658 A * 12/1985 Sommer et al. ............. 118/411
4,907,528 A * 3/1990 Sollinger ..................... 118/121
5,005,515 A * 4/1991 Sollinger ..................... 118/100
5,269,846 A * 12/1993 Eskelinen et al. ........... 118/100
5,356,519 A 10/1994 Grabscheid et al.
5,403,446 A * 4/1995 Trelsmo et al. ............. 162/281
5,474,656 A * 12/1995 Brown et al. ................ 162/272
5,556,512 A * 9/1996 Graf ........................... 162/272
5,645,517 A * 7/1997 Stotz ............................. 492/7
5,662,570 A * 9/1997 Stotz ............................. 492/7
5,833,106 A * 11/1998 Harris ......................... 226/17
5,993,548 A * 11/1999 Madrzak et al. ............. 118/123
6,197,112 B1 3/2001 Stotz et al.
6,358,368 B1 * 3/2002 Bernert et al. .............. 162/272
6,361,655 B1 3/2002 Holopainen et al.
6,672,028 B2 * 1/2004 Henninger ................... 52/843

FOREIGN PATENT DOCUMENTS

DE 197 13 195 A1 10/1998
FI 105578 B 9/2000

* cited by examiner

*Primary Examiner*—Essama Omgba
(74) *Attorney, Agent, or Firm*—Stiennnon & Stiennon

(57) ABSTRACT

A beam structure for a paper, board or finishing machine is suited for use in all applications where, for instance, a doctor or a coating device or a measuring device needs to be supported on a cross-directional beam of a paper or board machine. The beam (50) has an inner and outer shell (52, 54) which are situated inside each other and which are supported to each other over some of their length, and that one shell is supported stationarily by its ends to the frame structures (62) of the said paper, board or finishing machine, and that one shell deflects when the beam is loaded while the other shell remains essentially straight.

24 Claims, 7 Drawing Sheets

BEAM STRUCTURE FOR A PAPER, BOARD OR FINISHING MACHINE

CROSS REFERENCES TO RELATED APPLICATIONS

This application claims priority on Finnish App. No. 20041379, Filed Oct. 26, 2004, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention concerns a beam structure for a paper, board or finishing machine. The beam structure of the invention is suited for use in all applications where a device needs to be supported in the cross direction of a paper or board machine so that the said device stays as straight as possible. The beam of the invention is preferably used to support a doctor, or a coating, measuring, or washing device. Especially preferably, the beam structure comprises a beam which is made of a composite material and which is supported at the middle.

In the following, prior art beam solutions are presented using doctor support beams as examples, because they are the most common beam solutions and because their structures have also been applied in many other uses of beams.

Earlier, when paper machines were narrower and when the deflection criteria were less strict, a solid doctor support beam made of steel or other purposeful metal was sufficient. The characteristic feature of these beams is, however, that they cannot usually reach the quality level required by modern and fast paper machines in the control of deflection and potential vibrations.

This is why it was presented in the previous decade that doctor support beams would no longer be made of solid metal beams, but that they could be, for instance, hollow and rigid box-type structures which are potentially made of a composite material. Such doctor support beams are described in publications U.S. Pat. No. 5,356,519; DE-A1-197 13 195; and FI-B105578.

U.S. Pat. No. 5,356,519 describes a doctor support beam which consists of a hollow box-type structure where the cross section of the structure is either an equilateral or inequilateral polygon or oval. According to the publication, the structural material is fiber composite material.

German publication DE-A1-197 13 195 describes a doctor support beam where the load-bearing part consists of a number of tubular elements joined together, with the elements manufactured from a suitable fiber material. All of the said elements can have the same diameter, or they can also have different diameters. The publication also states that in addition to tubes with a round cross section, triangular tubes, for instance, can also be used.

Finnish patent publication FI-B-105578 describes a beam structure where the cross section consists of a curved part and a straight part. The curved part is preferably semicircular, and the straight part encloses it to form a box beam. The doctor blade or similar component is fastened to the point of contact between the curved part and the straight part by means of suitable devices.

The beam structures presented above, however, have not attained much success on the market. The reason for this can be both the complex structure of the beams which makes the beam unreasonably expensive, and their cross-sectional shape which is disadvantageous from the point of view of the manufacture of the beam and also raises the price of the beam. Moreover, a complex structure increases the risk of manufacturing defects considerably and may also lead more easily to breakages resulting from stress during operation.

However, since the beams made of a composite material, presented above, have mostly turned out to be practicable solutions with the exception of issues such as the above-mentioned high manufacturing costs and risks, the present invention has attempted to find a beam structure which could be manufactured inexpensively for instance from composite materials without ignoring the requirements imposed on the beam.

As known, a small deflection (recommended maximum guideline value is half a millimeter irrespective of the length of the beam, in some cases a maximum deflection of up to one millimeter is permitted at the middle of the beam) is one of the most important properties of a beam in all applications of beams. Moreover, especially in the case of doctor support beams, however, the vibration properties of the beam must be taken into account in the design of beams so that when using the conventional subcritical dimensioning, the first natural frequency of the beam would be at least 20 percent above the excitation frequency of the roll. When using supercritical dimensioning, the natural frequency of the beam would therefore be at least that much below the excitation frequency of the roll. Supercritical dimensioning could also be used in conjunction with the present invention because of the damping elements at the ends and because of deflection control so that even smaller beam dimensions could be reached.

SUMMARY OF THE INVENTION

In the attempt to attain beam manufacture which is as inexpensive as possible, the present invention uses as its starting point a tubular, preferably a cylindrical beam, which can be manufactured for instance from composite materials by winding. When examining a tubular or cylindrical body, it is easy to determine both the vibration and deflection properties of a beam by means of calculations without having to use model bodies.

When calculations were used for examining the use of a cylindrical box beam made of composite materials as a doctor support beam, it was found that it was not very difficult to fulfill the natural frequency requirement at least with the cylinder structure, but it would be more difficult to fulfill the deflection requirement. Fulfilling the deflection requirement requires either the use of a beam with a larger diameter, made of standard fibers, or the use of a beam with a smaller diameter but made of special fibers. In other words, a less expensive beam made of standard fibers has too large a diameter for many applications. On the other hand, a beam made of special fibers has a smaller size, but its price is much higher, and in some cases the use of special fibers almost doubles the price.

This is why the present invention aims to solve for instance the above-mentioned problems related to the manufacturing costs of the beam, diameter of the beam, deflection of the beam and natural vibration frequency of the beam so that the end result would be a box beam which could be used as well as possible in as many different applications of support beams as possible and which would be acceptable to the market with regard to both its price and size.

In the present invention, unlike in the German publication referred to above and presented in prior art FIG. 2 below, it has been decided to place the cylindrical beam parts inside each other so that some space can be saved. At the same time, however, it is possible to fully utilize the rigidity/deflection and vibration properties of the tubular structure. Furthermore, because the calculatory examinations revealed that it is very difficult to fully eliminate beam deflection, the starting point was that beam deflection is permitted, but it is only accepted in such a part of the beam which is not in actual contact with the doctor or the coating device or measuring device. For this reason, the present invention uses a double-shell beam where the shells are mostly at a distance from each other. In accordance with one preferred embodiment of the invention, the shells are in contact with each other only at the longitudinal middle section of the beam by means of a circular spacer so that the inner shell of the beam can deflect but the outer shell can stay straight.

As far as the advantages brought by the present invention are concerned, it can be stated that the double-shell beams of the invention:

have competitive manufacturing costs;

fulfill easily the requirements concerning their size as well as vibration and deflection properties;

are easy to manufacture, which means that manufacturing defects are minimized and operational reliability is increased;

can be manufactured easily from several materials, which means that the deflection and vibration properties of the beams can be controlled better.

The characteristic feature of the beam structure of a paper, board or finishing machine of the present invention is that the beam consists of an inner and outer shell which are situated inside each other and which are supported to each other over some of their length, and that one shell is supported stationarily by its ends to the frame structures of the said paper, board or finishing machine and that one shell deflects when the beam is loaded while the other shell remains essentially straight.

In the following, the beam structure of the present invention is described in more detail with reference to the accompanying drawings.

DESCRIPTION OF THE PREFERRED EMBODIMENTS

Figure 1:
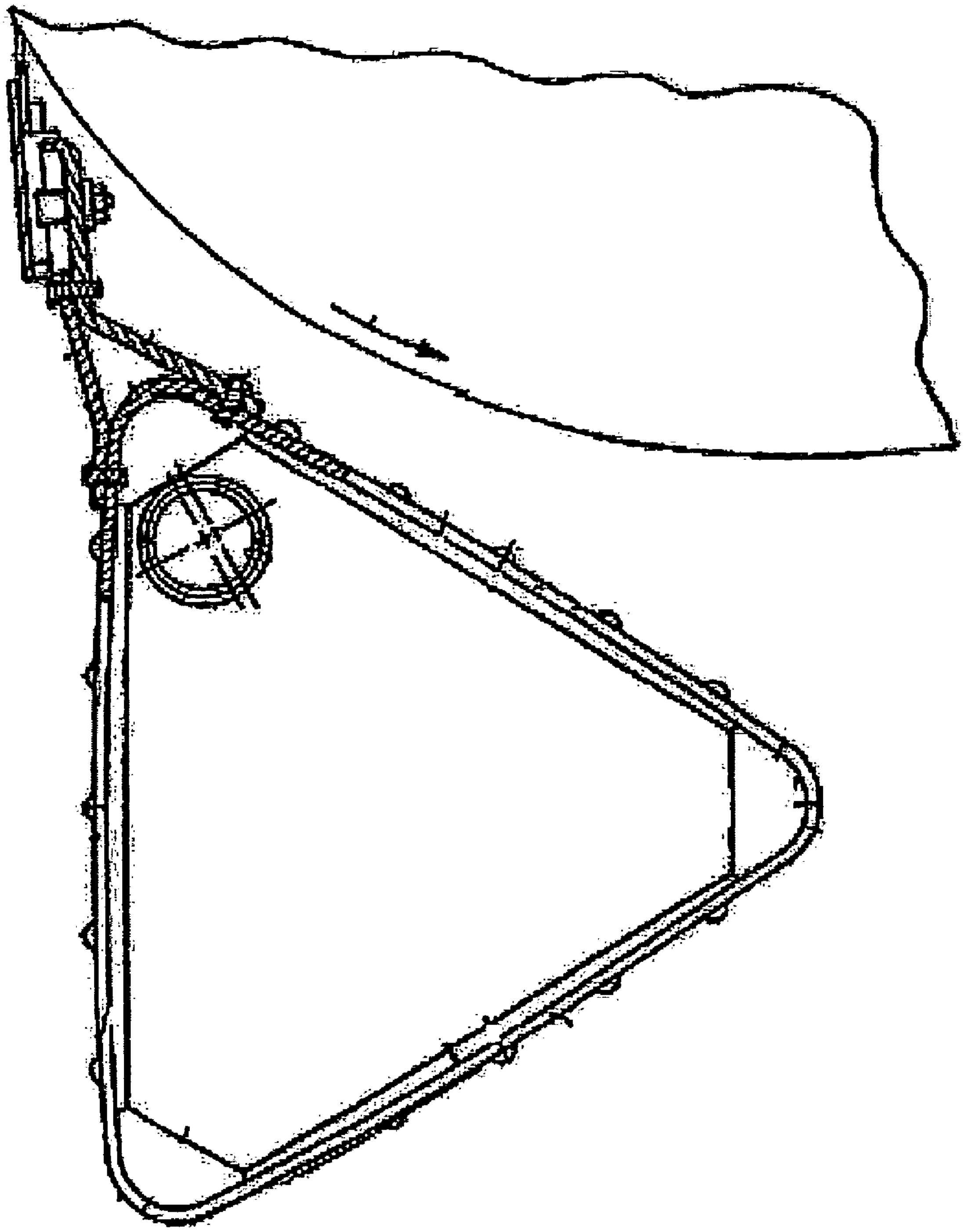
Fig. 1 PRIOR ART
FIG. 1 is a prior art doctor support beam made of a composite material, presented in U.S. Pat. No. 5,356,519.

U.S. Pat. No. 5,356,519, presented in FIG. 1, describes a doctor support beam which consists of a hollow box-type structure where the cross section of the structure is either an equilateral or inequilateral polygon or oval. The essential feature of the beam is that the walls of the beam are at least in part convex so that their radius of curvature is greater than the width of each of the longitudinal walls. Moreover, the walls are joined to each other by means of transition sections having a radius of curvature which is smaller than the width of an adjacent longitudinal wall. According to the publication, the structural material is fiber composite material.

Figure 2:
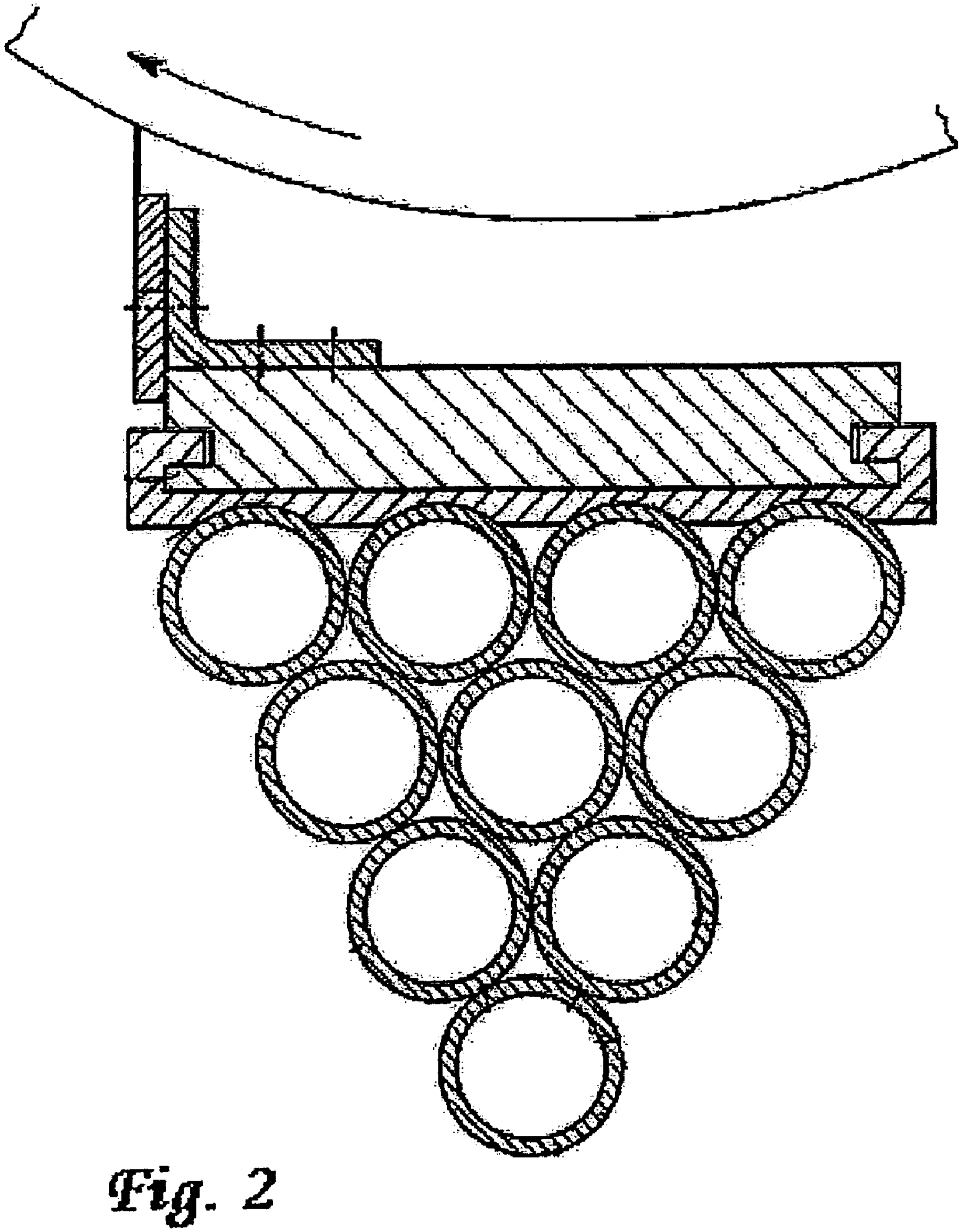
Fig. 2 PRIOR ART
FIG. 2 is a prior art doctor support beam made of a composite material, presented in DE application 197 13 195.

German publication DE-A1-197 13 195, presented in FIG. 2, describes a doctor support beam where the load-bearing part of the beam consists of a number of tubular elements which are assembled side by side and connected together and which are manufactured from some suitable fiber material. The essential feature of the structure presented in the publication is that the tubular elements rest against each other over their entire length through linear contact lines. All of the said elements can have either the same diameter or they can also have different diameters. The publication also presents that it is possible to use not only tubes which have a round cross section but also for instance triangular tubes.

Figure 3:
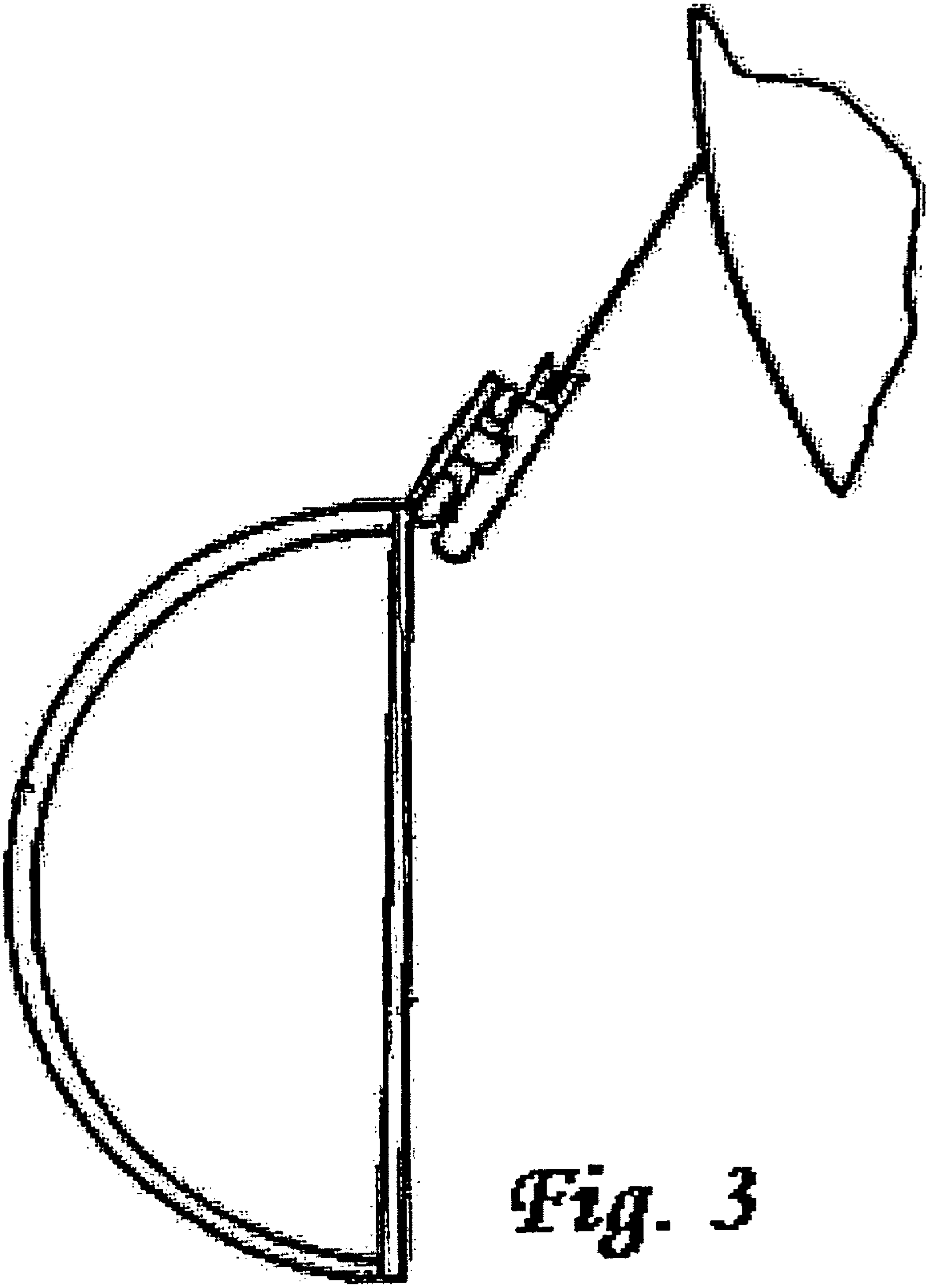
Fig. 3 PRIOR ART
FIG. 3 is a prior art doctor support beam made of a composite material, presented in FI patent 105578.

Finnish patent publication FI-B-105578 presented in FIG. 3 describes a beam structure where the cross section of the structure consists of a curved part and a straight part. The curved part is preferably semi-circular, and the straight part encloses it to form a box beam. The doctor blade or similar component is fastened to the point of contact between the curved part and the straight part by using suitable devices.

The beam structures presented above, however, have not turned out very usable in practice. The primary reason for this is the complicated manufacturing technology, which raises the price of the beam considerably high. The complicated manufacturing technology also partly leads to the possibility of manufacturing defects which cannot be eliminated even when good quality control is used. In other words, one of the objectives of the present invention is to develop a beam structure that employs simple manufacturing technology, which also leads to inexpensive manufacturing costs and smaller risk of manufacturing defects. This is one of the objectives of the beam structure that aims to utilize a cylindrical tube which is made of a composite material in accordance with one preferred embodiment of the invention, with the manufacturing process of the tube being very simple and the risks with regard to manufacturing defects, for instance, being minimal.

As was stated above, a mere simple straight cylindrical box beam is not an optimum solution either because its size (when using conventional fiber materials) is too large for most applications or because its price (when using special fibers) becomes unreasonably high.

Figure 4:
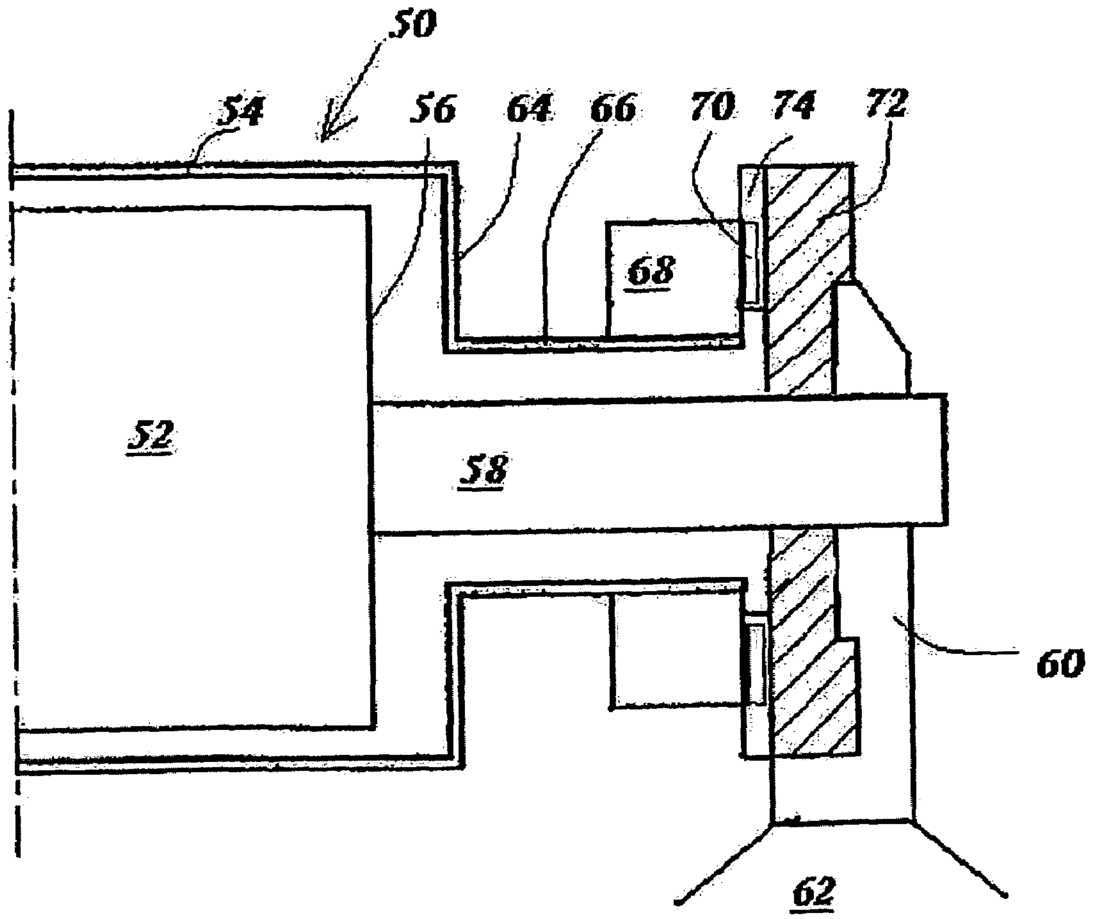
FIG. 4 is a double-shell beam structure in accordance with one preferred embodiment of the present invention.
Figure 5:
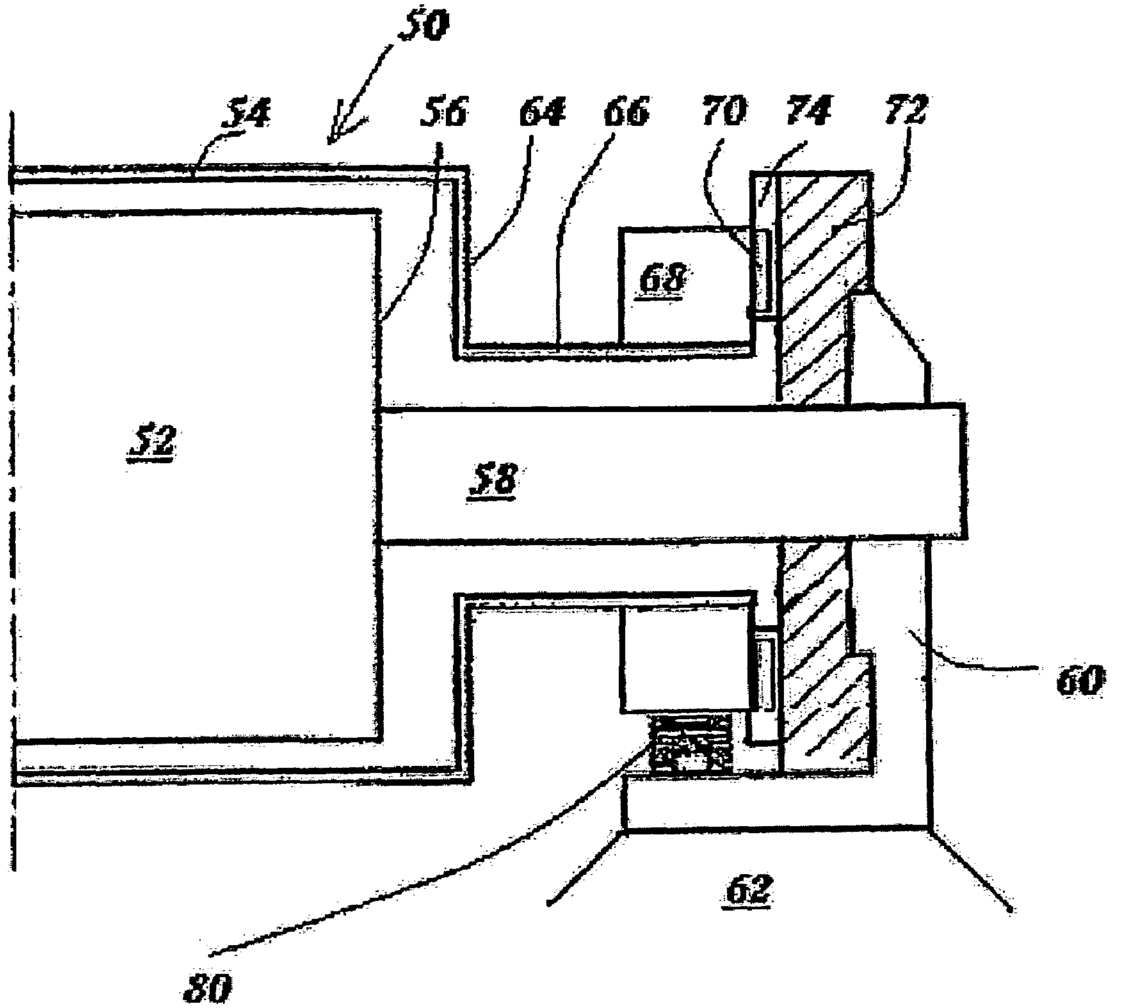
FIG. 5 is a schematic view of a beam structure in accordance with another preferred embodiment of the present invention.
Figure 6:
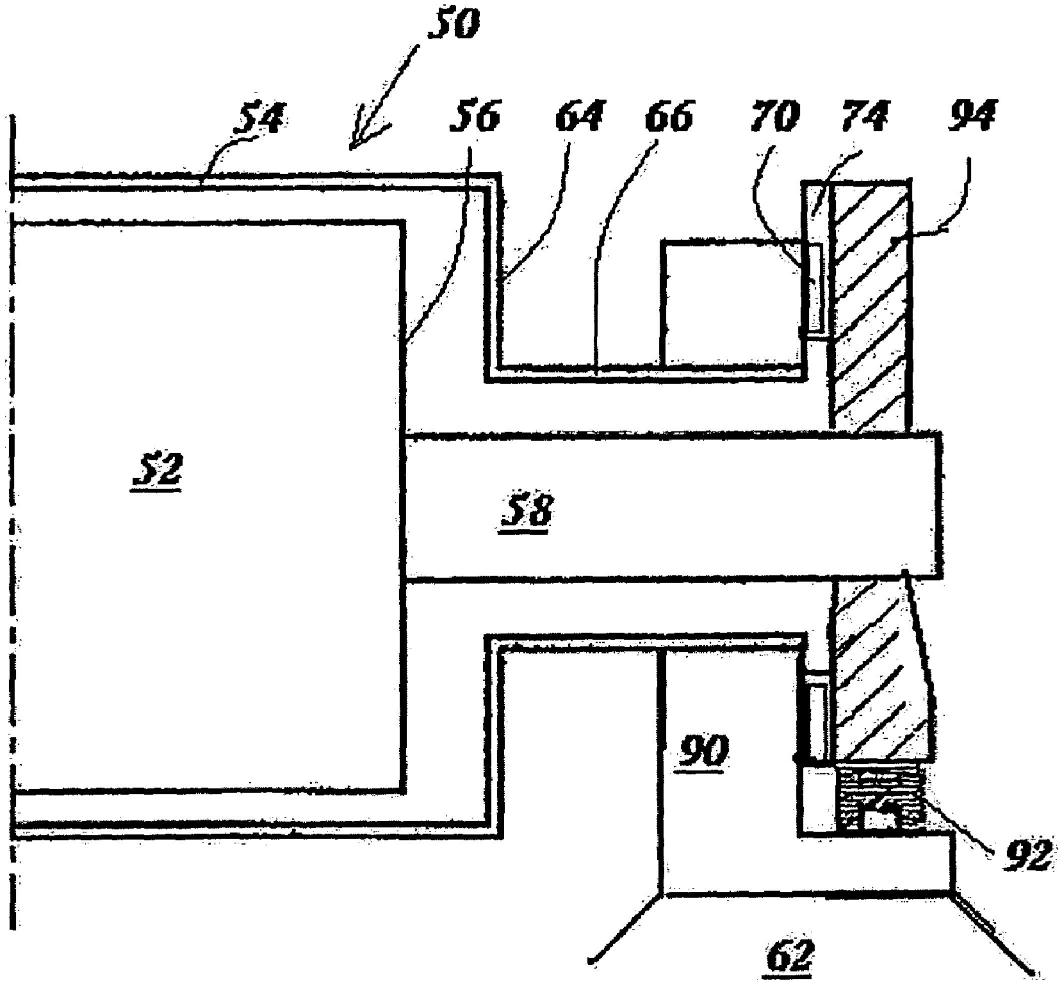
FIG. 6 is a schematic view of a beam structure in accordance with a third preferred embodiment of the present invention.
Figure 7:
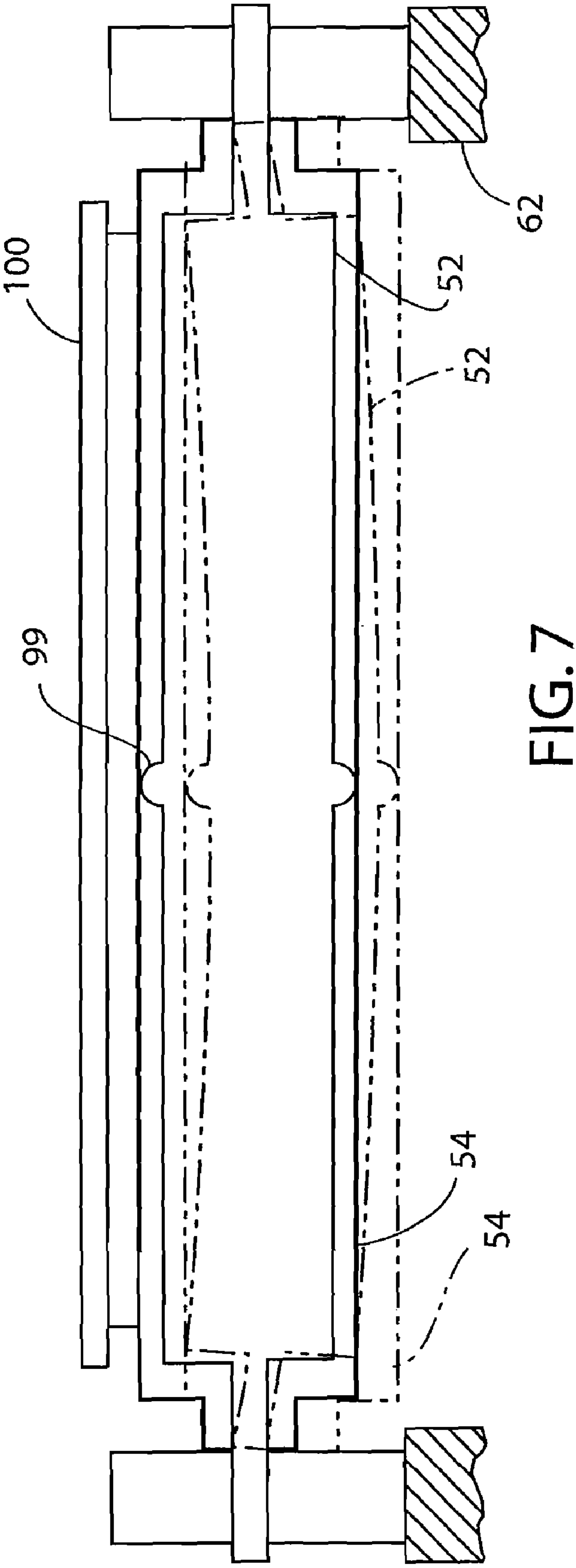
FIG. 7 is a schematic view of the apparatus of FIG. 4, shown both unloaded, and in an exaggerated loaded condition in phantom view.

FIG. 4 is a schematic view of a double-shell beam solution in accordance with one preferred embodiment of the invention. In its simplest configuration, the beam structure 50 consists of a cylindrical inner and outer shell 52 and 54 which are joined together at the middle section of the beam by means of a special spacer element 99, shown in FIG. 7, and of rods 58 fastened to the end plates 56 of the inner shell 52 as an extension to the inner shell. Although the rod 58 is shown in FIGS. 4-6 located on the axis of the beam structure, it may also be located on the side of the axial line of the beam. Preferably, however, the rods are essentially located on a plane which runs through the axial line of the beam, because the deflection of the beam also takes place on this plane. The cross section of the rods can have almost any shape. In other words, round shaft-type rods, hollow tubular rods, and various types of beams can be used, to name but a few cross section shapes. The rods 58 are fastened to the machine frame 62 or similar supports by means of brackets 60 on both sides of the machine. The desired device 100 (for instance a doctor, coating device or measuring device) installed in the cross direction of the machine is fastened to the outer shell 54 of the beam 50 either before or after the installation of the beam in its application, as shown in FIG. 7. The device installed can be a doctor or a blade coater, the blade holder of which is fastened to the beam. The device installed can also be for instance a measuring head which measures the cross-directional properties of paper. The measuring head can be either a full-width or a traversing measuring head, and in the latter case a rail in which the measuring head can move in the cross direction of the machine is fastened to the beam. The device installed can also be a washing device intended for the cleaning of a roll or fabric, for instance a traversing high pressure washing head, the traversing rail of which is fastened to the beam. When the beam is installed in place, its inner shell 52 deflects either by gravity alone or by both gravity and the force which is exerted on the beam or on the device, such as a doctor, fastened to it. In any case, when the inner shell 52 of the beam deflects, the outer shell 54 remains straight, because the clearance between the inner shell and the outer shell allows the deflection of the inner shell 52 without the inner shell extending up to the outer shell 54 even at its ends, where the deflection in relation to the outer shell is greatest. In this way, a doctor, coating device or measuring device fastened to the outer shell remains straight despite the deflection of the inner shell 52 of the beam.

FIG. 4 further presents a preferred embodiment of the invention, but not a necessary further embodiment, namely devices which guide the direction of movement of the outer shell 54. These devices consist of end plates 64 of the outer shell 54, with the end plates 64 being naturally open at the rod 58, of sleeves 66 or similar elements which essentially protrude in the longitudinal direction of the outer shell and which are fastened to the end plates 64, of guides 70 which are fastened to the said elements either directly or by means of a spacer 68, and of rails 74 which work together with the guides 70 and which are fastened to the brackets 60 either directly or by means of a spacer 72. The idea is that the guides 70 and rails 74 are installed in the same direction to which the beam tends to deflect naturally. Of course, the installation direction of the guides and rails can be used to influence the deflection direction of the beam so that the beam can be forced to deflect to a direction other than its natural deflection direction. One advantage in the use of the guides and rails is that when the direction of movement, or deflection direction, of the beam is bound, the vibration of the beam in a direction other than one determined by the guides and rails becomes essentially more difficult.

In accordance with one preferred structural alternative, the devices which determine the direction of movement of the beam, presented in FIG. 4, consist of two rails located at a distance from each other and fastened to the support structure, with a slide piece situated between the rails. The said rails can be arranged either on the side of the machine frame or on the beam side, and in a corresponding manner the slide piece can be arranged either on the beam side or on the side of the machine frame. The most varied guide structures can naturally be used within the scope of the invention. For this reason, for instance, it is also possible to arrange just one rail on the side of the machine frame or on the beam side and, correspondingly, two or more rollers can be arranged as its counter piece either on the beam side or on the side of the machine frame so that the rollers are located on both sides of the rail. Preferably, the said devices are arranged essentially in conjunction with a plane which runs through the center line of the beam, because the force exerted on the beam also influences in this direction, so that the potential friction involved cannot cause additional torsion to the beam. The said devices can naturally also be placed on both sides of the center line of the beam at an equal distance from the beam, which practically gives almost the same degree of balanced support. The piston-cylinder device presented in conjunction with FIG. 5 below can be given as an example of this.

As far as the said sleeves 66, in other words extensions of the outer shell 54 of the beam 50, are concerned, it is worth mentioning that they can be not only tubular but also rods or various types of profiles which essentially protrude outward from the end 64 of the outer shell in the longitudinal direction of the beam. In this way, the sleeves 66, which could better be referred to as elements 66, can be located, with respect to the rods 58 which are extensions to the inner shell 52, not only around the rods 58 but also parallel with the rods 58, essentially on that plane which runs through the center line of the beam where the force that loads the beam deflects the beam 50.

FIG. 5 presents a beam structure which is in principle similar to the embodiment of FIG. 4, containing one added preferred structural alternative which weakens the potential vibration tendency of the outer shell 54 of the beam. The said structural alternative consists of springs 80 which are arranged between sleeves 66 and brackets 60 or machine frame 62 or similar suspension either directly or by means of a spacer 68. The said springs 80 can be for instance cup springs or similar. The purpose of the springs is to prevent the ends of the outer shell 54 from moving/vibrating freely in the direction allowed by the guides. The important thing to consider in the location of the springs or similar is that when the beam is in the operating position, they must not draw or pull the ends of the outer shell of the beam to any direction but only to prevent the movement of the ends of the beam away from this ideal position.

The springs presented in FIG. 5 can also be replaced with other types of dampers, for instance rubber or hydraulic dampers are possible. Rubber dampers work essentially in the same manner as cup springs or similar. The hydraulic dampers can consist of either one or more hydraulic cylinders per each end of the beam. Moreover, a hydraulic accumulator and pipework are required. The devices which guide the movement and determine the direction of movement of the outer shell 54 of the beam, in conjunction of which the damping elements are also arranged, can also consist of cylinder-piston devices which are located on both sides of the sleeves 66 and which can be connected between the outer shell 54 of the beam and the machine frame or similar support structure in many ways. It is, for instance, possible to fasten the piston rod of the cylinder-piston device to the support structure and to fasten the hydraulic damping cylinder to the outer shell of the beam or preferably to a sleeve or similar part that is an extension to it by means of a spacer. When the piston, which is located in the damping cylinder and fastened to the piston rod, is provided with boreholes or other flow paths of the desired size, the structure provides damping of the desired effect when the hydraulic fluid flows through the flow paths from one chamber of the cylinder to the other chamber located on the opposite side of the piston, hence decelerating the movement of the outer shell of the beam with respect to the machine frame or similar support structure. If necessary, the flow paths which decelerate the flow of the hydraulic fluid can naturally also be arranged to run through the cylinder jacket or even from outside it through a separate throttle valve. Such hydraulic dampers are much better than mechanical spring or rubber solutions in terms of commissioning, because they adjust themselves to the desired position when the beam is being installed.

In addition to dampening movements in the deflection direction, the cylinder-piston solutions described above can also be used for guiding the direction of movement of the ends of the beam, which avoids the use of separate rails, guides and/or rollers.

The rigidity of the said dampers or similar flexible elements 80 at both ends of the beam is preferably chosen to be identical to the rigidity of the inner shell 52 which supports the outer shell 54 at the middle. In this case, the flexible elements yield equally as much as what the inner shell deflects so that the outer shell does not practically deflect at all.

In conjunction with FIG. 4 and FIG. 5 above, only the mobility of the support of the ends of the outer shell 54 of the beam solution was discussed. In other words, the starting point has been that the rods 58 of the inner shell 52, with the rods 58 being either axial or protruding at least at the ends of the shell in the longitudinal direction of the shell, are fastened stationarily to the frame structures 62 of the machine or to similar brackets. However, it is clear that it is relatively easy to make the structure opposite. In other words, the support of the ends of the inner shell 52 can be moving, and the support of the ends of the outer shell can be stationary. For instance, in the solution presented in FIG. 6, the end of the rod 58 protruding from the end 56 of the inner shell 52 is fastened to a bracket 94 which is fastened to the machine frame 62 by means of a special arrangement. The said special arrangement can comprise for instance a spring set with an adjustable position, a hydraulic adjustment device, or conventional simple screw adjustment, which all receive the load that tends to deflect the beam. The spring set 92 can be located either between the bracket 94 of the inner shell and the bracket 90 of the outer shell or directly between the bracket 94 of the inner shell and the machine frame 62. In any case, this structural alternative allows the inner shell 52 of the beam to deflect while the outer shell 54 of the beam is kept straight in its place.

The double-shell beam solution of the invention consists, as was presented above, of an outer shell and an inner shell, which are located at a distance from each other with the exception of the longitudinal middle section of the beam. When the beam is manufactured from a fiber material, the said distance can be arranged for instance so that when the beam is being manufactured, an expansion is wound over the middle section of the inner shell between two sleeve-like molds arranged at the end regions of the inner shell. The thickness of the sleeves corresponds to the said distance, and the spacing between the sleeves at the middle section of the beam corresponds to the length of the said expansion. When the expansion is ready, the outer shell of the beam is wound over the molds and the expansion to the desired thickness. If the shells of the beam are made of different materials, material change can be done easily in conjunction with the installation of the molds.

In a solution in accordance with one preferred embodiment of the invention, the shells of the beam are not actually fastened to each other, but an expansion is made on the inner shell, essentially on its center line, with the diameter of the expansion essentially corresponding to the inner diameter of the outer shell so that the inner shell can be pushed inside the outer shell, or vice versa, without causing any kind of expansion on the outer surface of the outer shell.

The material alternatives for the double-shell beam of the present invention are in principle free, in other words various types of metals and composites and their combinations can be used as the materials. However, the beam is preferably made of a composite material, in which case the beam can be made of carbon fibers, ordinary glass fibers or especially strong so-called pitch fibers, which are carbon fibers manufactured using a specific pitch method.

Also, even though it was described above that the manufacturing method of a composite beam is winding, the manufacturing method can just as well be pultrusion. Similarly, even though a round shape was presented above for the cross section of the beam, the cross section of the beam can also be square, rectangular, polygonal or elliptic, or in practice any cross section profile that allows the use of two shells inside each other as described above. In other words, the shells must be capable of bending at least partly irrespective of each other.

It must also be taken into account that the beam solution of the invention also covers structures where the shells of the beam are not supported to each other at the longitudinal middle section of the beam only but at some other point. In other words, the shells of the beam can be supported to each other either at the very ends of the beam or at some point between the ends and the middle section, including solutions where there is a support both at the ends and between the ends and the middle point. In this way, there can be multiple support points. It is further possible to use structural alternatives where the shells of the beam are supported to each other so that there is no support point on the longitudinal middle point of the beam, but there are even several support points at equal spacing when moving towards the ends of the beam. These solutions are possible because the forces loading the beam are known, which is why the supports can be dimensioned so that the inner shell retains its necessary curvature and the outer shell remains straight. Naturally, a similar result can be achieved by constructing one or both of the shells so that their rigidity changes in the longitudinal direction of the beam.

As can be seen in what has been presented above, a completely new type of double-shell beam structure has been developed, capable of reducing or even completely eliminating many problems and shortcomings characteristic of prior art beams of a paper, board or finishing machine. The above exemplifications of the alternative support structures give an opportunity to control and guide the deflection and the deflection direction of the double-shell beams as is necessary in each case. It is also to be noted that while conventional beams are only supported at their ends to the frame structures of the machine, the beam (or more exactly, the outer shell of the beam) of the present invention is supported at least between its ends. If the outer shell is also supported at several points, the support in question stiffens the beam structure considerably so that even relatively small beams can fulfill the deflection and vibration criteria set for the beam. The above description of the invention, however, only describes the invention through some exemplified and schematic embodiments. This is why it is clear that the invention may differ considerably from what has been presented above, still falling within the limits of the appended claims.

We claim:

1. An apparatus for mounting a cross-directional device in a paper, board, or finishing machine, said machine having a frame, the apparatus comprising:

an outer shell having two ends and an interior;

an inner shell which extends within the outer shell, the inner shell having two ends, and an element on the inner shell engages the interior of the outer shell at at least one support point, but not continuously between the two ends of the outer shell, such that the outer shell, and the inner shell are arranged so that the outer shell, and the inner shell are capable of bending at least partly irrespective of each other;

wherein the inner and outer shell define a beam having an axial line and a plane containing said line, the beam for the mounting thereto of the cross-directional device, wherein one of the outer shell and the inner shell is fixed by its ends to the frame by first mounts, and the other of the outer shell and the inner shell is mounted by second mounts to the frame structure to allow movements in the direction of loads applied to the beam, wherein the second mounts are configured such that said movements are constrained by the second mounts to lie in the plane containing the axial line, such that one shell deflects when the beam is loaded while the other shell remains essentially straight.

2. The apparatus of claim 1, wherein the inner shell is fixed to the frame structure, and wherein the outer shell is supported to the frame by guides which form the second mounts which constrain the outer shell to move in the plane containing the axial line.

3. The apparatus of claim 2 wherein the outer shell is supported to the frame by damping devices.

4. The apparatus of claim 3 wherein said damping devices comprise springs, damping rubbers, or hydraulic piston-cylinder devices.

5. The apparatus of claim 1, wherein the outer shell is fixed to the frame structure, and the inner shell is supported to the frame by guides which form the second mounts which constrain the outer shell to move in the plane containing the axial line.

6. The apparatus of claim 5 wherein the inner shell is supported to the frame by damping devices.

7. The apparatus of claim 6 wherein said damping devices comprise springs, damping rubbers, or hydraulic piston-cylinder devices.

8. The apparatus of claim 1 wherein the inner shell comprises:

end plates located opposite ends thereof; and rods which protrude from the end plates and which extend in a longitudinal direction, which rods are mounted to the first mounts or the second mounts.

9. The apparatus of claim 1 wherein the inner shell has rods and is supported on the rods by intermediate brackets mounted to damping devices mounted to the frame.

10. The apparatus of claim 9 wherein said damping devices comprise springs, damping rubbers, or hydraulic piston-cylinder devices.

11. The apparatus of claim 1 further comprising:

end plates at opposite ends of the outer shell; and sleeves connected to the end plates which protrude in a longitudinal direction of the shell and are mounted to the first mounts or the second mounts.

12. The apparatus of claim 11 wherein the outer shell is fastened to the frame by the sleeves.

13. The apparatus of claim 11 wherein the outer shell of the beam is supported to the frame by the sleeves which are mounted to guides which engage rails mounted to the frame.

14. The apparatus of claim 13 wherein the outer shell of the beam is also supported to the frame by damping devices.

15. The apparatus of claim 14 wherein said damping devices comprise springs, damping rubbers, or hydraulic piston-cylinder devices.

16. The apparatus of claim 1 further comprising piston-cylinder devices located on both sides of the beam, which are connected between the outer shell which remains essentially straight and the frame, the piston-cylinder devices performing a damping function as well as serving as guides which guide the movement of the ends of the outer shell.

17. The apparatus of claim 1 wherein the at least one support point is located at the longitudinal middle point of the beam.

18. The apparatus of claim 1 wherein the inner shell engages the interior of the outer shell at a plurality of points over the length of the beam between the two ends.

19. The apparatus of claim 1 wherein the beam is made of a composite material.

20. The apparatus of claim 1 further comprising a doctor, coating device, measuring device, or cleaning device fixed to the beam.

21. The apparatus of claim 1 wherein the shells of the beam have a tubular cross section.

22. The apparatus of claim 21 wherein the tubular cross section is round, elliptic or polygonal.

23. An apparatus for mounting a cross-directional device in a paper, board, or finishing machine, said machine having a frame, the apparatus comprising:

an outer shell having two ends and an interior;

an inner shell which extends within the outer shell, the inner shell having two ends, and an element on the inner shell engages the interior of the outer shell at at least one support point between the two ends of the outer shell, the inner and outer shell defining a beam for the mounting thereto of the cross-directional device, wherein one of the outer shell and the inner shell is fixed by its ends to the frame, and the other of the outer shell and the inner shell is mounted to the frame structure to allow movement in the direction of loads applied to the beam, such that one shell deflects when the beam is loaded while the other shell remains essentially straight;

wherein the inner shell is fixed to the frame structure, and wherein the outer shell is supported to the frame by guides, and wherein said guides comprise:

one or more slide rails; and slide pieces working in conjunction with the one or more slide rails, wherein one of these are connected to the outer shell of the beam and the other is connected to the frame.

24. An apparatus for mounting a cross-directional device in a paper, board, or finishing machine, said machine having a frame, the apparatus comprising:

an outer shell having two ends and an interior;

an inner shell which extends within the outer shell, the inner shell having two ends, and an element on the inner shell engages the interior of the outer shell at at least one support point between the two ends of the outer shell, the inner and outer shell defining a beam for the mounting thereto of the cross-directional device, wherein one of the outer shell and the inner shell is fixed by its ends to the frame, and the other of the outer shell and the inner shell is mounted to the frame structure to allow movement in the direction of loads applied to the beam, such that one shell deflects when the beam is loaded while the other shell remains essentially straight;

wherein the inner shell is fixed to the frame structure, and wherein the outer shell is supported to the frame by guides, wherein said guides comprise:

one or more slide rails; and slide pieces working in conjunction with the one or more slide rails, wherein one of these are connected to the inner shell of the beam and the other is connected to the frame.

* * * * *